US008774166B2

(12) United States Patent
Witzel et al.

(10) Patent No.: US 8,774,166 B2
(45) Date of Patent: Jul. 8, 2014

(54) METHOD OF PROVIDING VALUE ADDED SERVICE IN A PACKET SWITCHED TELECOMMUNICATIONS NETWORK AND A SERVICE INTERFACE ADAPTER FOR USE IN SUCH METHOD

(75) Inventors: Andreas Witzel, Herzogenrath (DE); Karl-Peter Ranke, Herzogenrath (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 662 days.

(21) Appl. No.: 12/918,026

(22) PCT Filed: Feb. 21, 2008

(86) PCT No.: PCT/EP2008/001378
§ 371 (c)(1),
(2), (4) Date: Aug. 25, 2010

(87) PCT Pub. No.: WO2009/103317
PCT Pub. Date: Aug. 27, 2009

(65) Prior Publication Data
US 2010/0309822 A1  Dec. 9, 2010

(51) Int. Cl.
*H04L 12/66*  (2006.01)
(52) U.S. Cl.
USPC ........... 370/352; 370/259; 370/389; 370/401; 370/356
(58) Field of Classification Search
USPC .......... 370/352, 259, 389, 401, 354, 355, 356
See application file for complete search history.

(56) References Cited

U.S. PATENT DOCUMENTS

| 6,724,748 B1* | 4/2004 | Stille et al. ..................... 370/352 |
| 7,283,513 B2* | 10/2007 | Hundscheidt et al. ........ 370/352 |
| 7,359,373 B2* | 4/2008 | Kuusinen et al. ............. 370/352 |

(Continued)

FOREIGN PATENT DOCUMENTS

| EP | 1 739 919 A | 1/2007 |
| GB | 2 440 987 A | 2/2008 |

OTHER PUBLICATIONS

3rd Generation Partnership Project; Technical Specifications Group Core Network and Terminals; Customised Applications for Mobile network Enhanced Logic (CAMEL) Phase 4; Stage 2; IM CN Interworking (Release 7). 3GPP TS 23.278 v7.1.0 (Mar. 2006).

(Continued)

*Primary Examiner* — Rasheed Gidado (57) ABSTRACT

A method of providing in a packet switched telecommunications network, for a communications session involving a user of said packet switched telecommunications network a value added service associated with a circuit switched telecommunication network. The method comprises the steps of establishing a first signaling data stream of a first basic call state model of a packet switched dedicated protocol type between the packet switched telecommunications network and a service interface adapter unit, and establishing a second signaling data stream of a second basic call state model of a circuit switched dedicated protocol type between the service interface adapter unit and the circuit switched telecommunications network, based on information from the first signaling data stream, for providing the value added service from the circuit switched telecommunications network. The information is augmented with further information for establishing the second signaling data stream, and for exchanging data between the first and second signaling data stream for providing the value added service to the user through the packet switched telecommunications network.

16 Claims, 4 Drawing Sheets

(56) References Cited

U.S. PATENT DOCUMENTS

| | | |
|---|---|---|
| 2003/0027569 A1* | 2/2003 | Ejzak .......................... 455/432 |
| 2004/0242227 A1* | 12/2004 | Huotari et al. ............ 455/432.1 |
| 2004/0246949 A1 | 12/2004 | Cannon |
| 2005/0169244 A1* | 8/2005 | Luken .......................... 370/352 |
| 2007/0053343 A1* | 3/2007 | Suotula et al. ............... 370/352 |
| 2007/0121608 A1* | 5/2007 | Gu et al. ...................... 370/356 |
| 2007/0133782 A1* | 6/2007 | Zhu ......................... 379/265.09 |
| 2010/0098056 A1* | 4/2010 | Falkena et al. ............... 370/352 |
| 2010/0118861 A1* | 5/2010 | Witzel et al. ................. 370/352 |

OTHER PUBLICATIONS

3$^{rd}$ Generation Partnership Project; Technical Specification Group Core Network; IP Multimedia (IM) session handling; IM call model; Stage 2 (Release 7) 3GPP TS 23.218 V7.6.0 (Jun. 2007).

3$^{rd}$ Generation Partnership Project; Technical Specification Group Core Network and Terminals; Interworking between the IP Multimedia (IM) Core Network (CN) subsystem and Circuit Switched (CS) networks (Release 7) 3GPP TS 29.163 V7.8.0 (Sep. 2007).

* cited by examiner

METHOD OF PROVIDING VALUE ADDED SERVICE IN A PACKET SWITCHED TELECOMMUNICATIONS NETWORK AND A SERVICE INTERFACE ADAPTER FOR USE IN SUCH METHOD

FIELD OF THE INVENTION

The present invention relates generally to a method of providing in a packet switched telecommunications network for a communication session involving a user of said packet switched telecommunications network, at least one value added service associated with a circuit switched telecommunications network.

The invention further relates to a method of operating a service interface adapter, a service interface adapter for use in a method as mentioned above, a telecommunications network applying such a method, and a telecommunications service provided using the method.

BACKGROUND

Mobile networks are currently evolving from pure circuit switched (CS) networks towards internet protocol (IP) based packet switched (PS) networks, and by that seamlessly integrate into IP based infrastructure that is also used for the Internet, the World Wide Web and the datacom industry. One trend seen on the telecommunications market is that mobile operators want to migrate their customer base from the CS domain towards IP multimedia subsystem (IMS) domain in order to open up for new revenue streams from the new services available in IMS. Another trend to be observed is that mobile operators try to increase the revenues by extending the customer base to the fixed access domain. This is done by acquiring new fixed subscribers, but also by offering a fixed line access for existing mobile subscribers.

An essential problem of IMS migration is that customers are used to the services that are available in the CS domain. Those services include the supplementary services as defined for global system for mobile communications (GSM), but also operator specific services and customized services implemented via the capabilities of intelligent networks (IN) and customised applications for mobile networks enhanced logic (CAMEL).

In order to resolve the above problem, the 3rd Generation Partnership Project (3GPP) has specified the IP Multimedia Service Switching Function (IM-SSF). The IM-SSF is, as defined in the corresponding 3GPP specification TS 23.218, a CAMEL functional entity that provides the interworking between session initiation protocol (SIP) session control and the CAMEL state models. The IM-SSF also provides a CAMEL interface to the home subscriber server (HSS) for downloading the subscriber's CAMEL Subscription Information (CSI) data for IMS. In fact, the IM-SSF is a session initiation protocol (SIP) application server (SIP-AS) that interfaces SIP to a CAMEL application part (CAP) similar signalling protocol.

The IM-SSF is a SIP Application Server (SIP-AS) in IMS, enabling provisioning of CS services to users of the IMS network. It therefore has an incoming SIP signalling data stream, an outgoing SIP signalling data stream, and at least an outgoing CAP-like data stream. The CAP-like data stream provides detection points to a sort of CAMEL service environment (CSE), enabling provision of the desired CS services.

Even though the CAP-like data stream provided by the IM-SSF corresponds to a 3GPP standardized CAP protocol version, it is tailor made for the IM-SSF and therefore slightly differs from CAP versions as used in a standard CSE in an IN/CAMEL network. The reason for using a tailor made CAP version with the IM-SSF is that the IM-SSF uses IP multimedia basic call state model (IM-BCSM) as the basic call state model (BCSM) on the basis of which detection points (DP) in CAP are provided to the CSE. IM-BSCM is the BSCM that is used for SIP signalling in the IMS network, and due to the different nature of IMS networks and IN/CAMEL networks, it differs from basic call state models used in IN/CAMEL networks, such as O-BCSM or T-BCSM under standard CAP versions used in circuit switched networks. In order to provide services based on this tailor made CAP-like protocol used by the IM-SSF, it requires a CSE which is tailored to the CAP-like data stream provided by the IM-SSF. A standard CSE available in regular IN/CAMEL CS networks cannot be applied, because the CAP version of the CAP data stream supported by the IM-SSF cannot be processed in such an environment. The tailor made CSE used for providing the services to users of the IMS network is therefore an adapted version of a regular CSE, and is made available in the IMS network where it is usually implemented.

Due to the mismatch between IM-BCSM based detection points provided by the CAP date stream from the IM-SSF, the adapted CSE used by the IM-SSF for providing services in the IMS is a restricted environment wherein a limited number of services may be provided. Each new service to be provided in the IMS network has to be implemented separately in the CSE tailored for the IM-SSF. This re-implementation of services in IMS (which services were already available in the CS network) is costly, as it has to be tailored to the non-standard CAP-like version provided by the IM-SSF.

On the other hand, existing implementations of the services in the circuit switched network, subject to main investments at the time these implementations were made, are left unused and thus gradually become obsolete.

SUMMARY OF THE INVENTION

It is an object of the present invention to provide a method and network node for providing value added services in a packet switched telecommunications network, which value added services are associated with a circuit switched telecommunications network, wherein the existing implementations of services in the circuit switched network can be maintained and re-used.

It is a further object of the present invention to provide a method that enables expanding the circuit switched associated value added services provided in a packet switched network extensively.

In addition, it is an object of the present invention to enable providing circuit switched associated services in a package switched network, which value added services are experienced as genuine circuit switched services that a user is used to in relation to a circuit switched network.

These and other objects are achieved by the present invention in that there is provided method of providing in a packet switched telecommunications network, for a communications session involving a user of said packet switched telecommunications network, at least one value added service associated with a circuit switched telecommunications network, said method comprises the steps of: establishing a first signalling data stream of a first basic call state model of a packet switched dedicated protocol type between said packet switched telecommunications network and a service interface adapter unit; and establishing a second signalling data stream of a second basic call state model of a circuit switched dedicated protocol type between said service interface adapter unit and said circuit switched telecommunications network, based on information from said first signalling data stream, for providing said at least one value added service from said circuit switched telecommunications network; and wherein said information is augmented with further information for establishing said second signalling data stream, and for exchanging data between said first and second signalling data stream for providing said at least one value added service to said user through said packet switched telecommunications network.

The IN and CAMEL based value added services in a circuit switched network represent an expensive asset which mainly consists of the back—and investments for service script implementation, charging solutions, service integration, service provisioning, use and database, administrative support and related application server hardware. Enabling re-use of existing IN/CAMEL based services therefore represents a major improvement to the present situation wherein only a limited set of 'look-alike' circuit switched associated value added services can be provided in the IMS network.

The present invention is based on the insight that a complete conversion between SIP signalling method and CAP signalling method can be made by actively retrieving further information for completing the translation between SIP signalling and CAP signalling methods. The information from the SIP signalling received by the service interface adapter is augmented with said further information in order to establish the second signalling data stream which is fully compatible with the signalling used in the IN/CAMEL network. The prior art IM-SSF merely generates detection points (DP) upon occurrence of certain data in the first (packet switched) signalling data stream. The IM-SSF is therefore limited in it's capability of providing information for generating circuit switched type services in the packet switched network, and thus requires an adapted CAMEL Service Environment (CSE). In the present invention, because the information from the first signalling data stream is augmented with further information, the establishing of a second (genuine circuit switched) signalling data stream according to the circuit switched type basic call state model is enabled. Therefore, full control of network nodes available in the circuit switched network, based on the second signalling data stream provided using the method of the present invention, becomes possible. These services may therefore be provided to the users of the package switched network using the existing circuit switched and package switched infrastructure, leading to extensive advantages over the prior art methods of providing similar services. Because the existing circuit switched infrastructure can be re-used, including the existing already implemented circuit switched services, it is no longer necessary for the telecommunications service provider to re-implement these services in the package switched network.

It is important to notice the difference between simply generating detection points based on information in the e.g. SIP signalling on one hand, and augmenting the information available from the SIP signalling with further information in order to provide a circuit switched signalling data stream which is fully compatible with the IN/CAMEL network. The latter option makes the method and means for performing the method transparent within the circuit switched network, whereas the former requires a CAMEL Service Environment comprising many modifications in order to adapt it for providing the required services.

The further information used for augmenting the information from the first signalling data stream, may comprise, according to an embodiment, mapping information for mapping the information from the first signalling data stream to required information for establishing the second signalling data stream. The mapping information is then used for performing the mapping for establishing the second signalling data stream. In particular a mapping can be performed such as is defined by 3GPP standard TS 29.163.

According to another embodiment of the present invention the further information is retrieved from a database. This further information may comprise information for translating location information in the first signalling data stream (such as location or geographical information in a SIP Invite header) into location information such as is used in a circuit switched telecommunications network.

Another option is that the further information is retrieved from the circuit switched telecommunications network itself, for example by re-using existing functions in network nodes such as a mobile switching centre (MSC), gsmSSF or SSF, for generating relevant parameters for establishing the second signalling data stream. Network nodes that may be used for generating such information may comprise a mobile switching centre (MSC), a service switching function (SSF), such as a global system for mobile communications service switching function (gsmSSF), a service control entity (SCP), a location register such as a home location register (HLR) or a visitor location register (VLR).

The further information may also be retrieved from the package switched telecommunications network, e.g. by consulting network nodes within the package switched telecommunications network for providing the information.

As mentioned above, the package switched telecommunications network may be an internet protocol (IP) multimedia subsystem (IMS) or similar network environment. Using the method of the present invention, services may be provided originating from the circuit switched telecommunications network to users in the package switched telecommunications network. These users may include users of only the package switched telecommunications network, or users that both have subscriptions to the package switched telecommunications network and the circuit switched telecommunications network. A network entity such as a service control point (SCP) in the circuit switched telecommunications network.

The method of the present invention can be implemented by means of a service interface adapter, such as the service interface adapter described below in accordance with the third aspect of the present invention, which service interface adapter is arranged for receiving the first signalling data stream, and for establishing the second signalling data stream based on information from the first signalling data stream which is augmented by further information as described above.

The service interface adapter may for example be used as an application server in a package switched telecommunications network, such as a SIP-AS in an IMS network. In the particular case of an IMS network, the service interface adapter may also be connected to a multimedia telephony applicant server node (MMtel-AS) in the IMS.

The service interface adapter mentioned above may be used as a functional entity of the circuit switched telecommunications network, and may for example be integrated in a mobile switching centre (MSC) or service control entity (SCP) of the circuit switched telecommunications network. It may also be performed by a stand alone network node.

According to an embodiment of the method of the present invention, it may be advantageous to retrieve user identification data for identifying value added services that are available to the user in the circuit switched network. This user identification data can be part of the further information used for augmenting the information from the first signalling data stream. The user identification data may comprise the international mobile subscriber identity (IMSI) of the user in the circuit switched network, or may comprise the IP multimedia public identity (IMPI/IMPU) of the user in the packet switched communications network. In analogy with earlier described mappings, the IMPI may also be acquired from the first signalling data stream, and may be snapped to the IMSI, using for example a mapping database. In case a service interface adapter is used, the mapping database may be part of the service interface adapter.

Another option is that the IMSI is transferred from a home subscriber server (HSS) to a service interface adapter via service information (SI) over Cx. Such SI may be received by the serving call session control function (S-CSCF) as part of initial filter criteria (IFC) over Cx in the IMS network. This SI is not used by the S-CSCF, but may be forwarded to the service interface adapter, e.g. acting as SIP-AS in the IMS. The SI may be provided during a third party registration procedure to the service interface adapter.

Alternatively, the IMSI can be added as a suffix to the application server name in the initial filter criteria (IFC) provisioned in the home subscriber server (HSS). The application server name can be modified straightforward in the HSS in order to add the required information.

The above provides a number of alternatives for receiving the user identification data by analysis of the first signalling data stream. In particular, the user identification data may be acquired by analysing the SIP invite headers, i.e. the P-asserted-ID parameter for originating sessions, and the request-uniform resource identifier (request-URI) parameter for terminating sessions.

The method may be applied to audio or video communications sessions, and may thus comprise a step of verifying the type of communication session in order to provide the at least one value added service dependent on the communication session type.

In addition to the above, the method of the present invention may comprise a step of releasing the second signalling data stream after the at least one value added service has been provided, for processing the communication session within the package switched network. The communication session may be terminated upon release of the second signalling data stream, or may be continued within the IMS network.

According to a second aspect of the present invention there is provided a method of operating a service interface adapter, comprising the steps of receiving a first signalling data stream of a first basic call state model of a packet switched dedicated protocol type from a packet switched network, based on information from said first signalling data stream establishing a second signalling data stream of a second basic call state model of a circuit switched dedicated protocol type between said service interface adapter and a circuit switched network, and wherein said information is augmented with further information for establishing said second signalling data stream and for exchanging data between said first and second signalling data stream for providing said at least one value added service from said circuit switched telecommunications network to said user through said packet switched telecommunications network.

According to a third aspect of the present invention there is provided a service interface adapter for use in a method according to any of the previous claims, said service interface adapter being arranged for providing at least one value added service associated with a circuit switched telecommunications network in a packet switched telecommunications network for a communications session involving a user of said packet switched telecommunications network, wherein said service interface adapter comprises at least one interface unit for establishing a first connection with said packet switched telecommunications network and for establishing a second connection with said circuit switched telecommunications network, further comprising at least one signalling unit for processing a first signalling data stream of a first basic call state model of a packet switched dedicated protocol type received from said packet switched telecommunications network through said interface unit, and for establishing, based on information from said first signalling data stream, a second signalling data stream of a second basic call state model of a circuit switched dedicated protocol type between said interface unit and said circuit switched telecommunications network, further comprising a information augmenting unit for augmenting said information with further information, for establishing said second signalling data stream and for exchanging data between said first and second signalling data stream for providing said at least one value added service from said circuit switched telecommunications network to said user through said packet switched telecommunications network.

According to a fourth aspect of the present invention there is provided a telecommunications network comprising a service interface adapter as described above in accordance with the third aspect of the invention.

In accordance with a fifth aspect of the present invention there is provided a telecommunications service provided to a user in a packet switched telecommunications network where making use of a circuit switched telecommunications network, wherein said service is provided using a method according to the first and/or second aspect of the present invention.

BRIEF DESCRIPTION OF THE DRAWINGS

The present invention will now further be elucidated by means of some specific examples, with reference to the enclosed drawings, wherein.

DETAILED DESCRIPTION OF THE INVENTION

Figure 1:
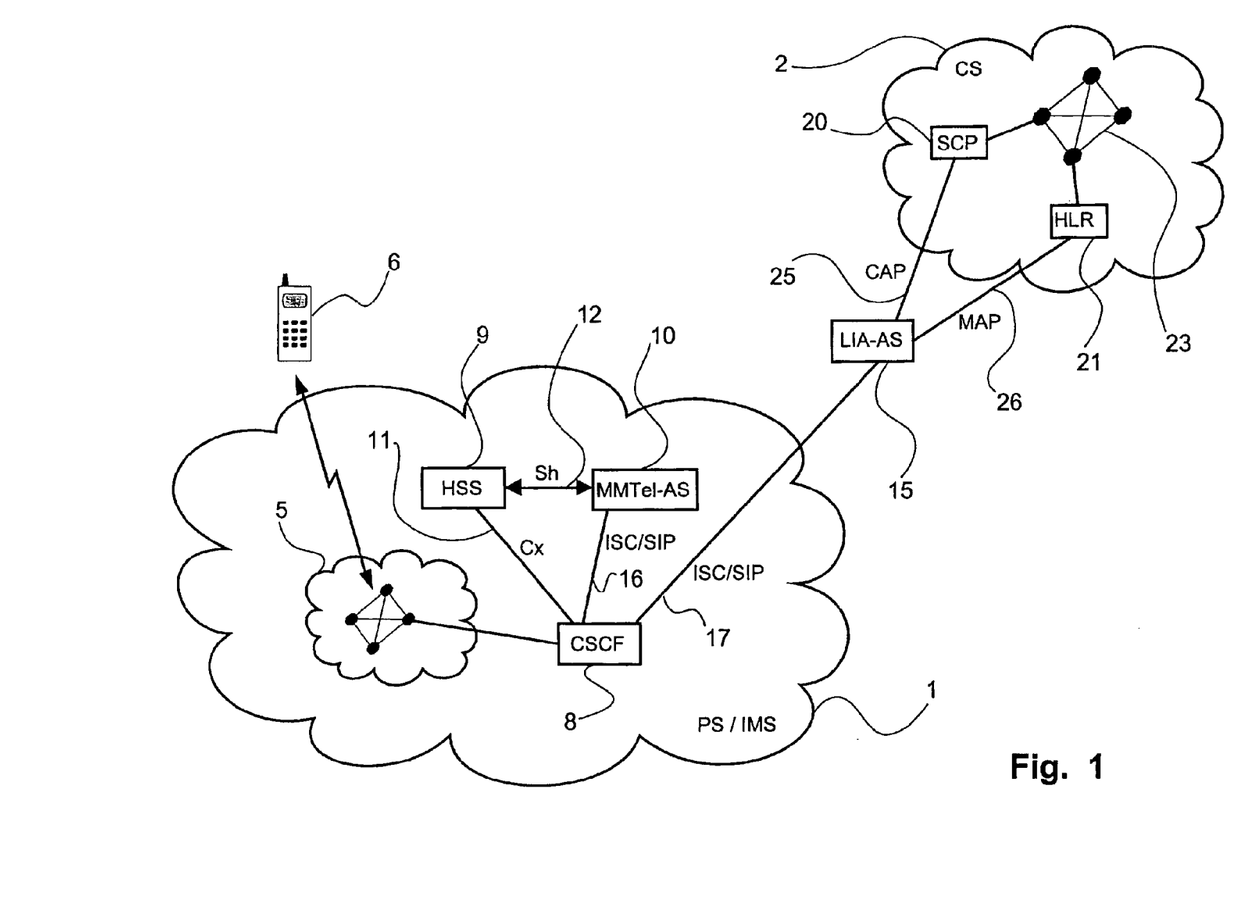
FIG. 1 discloses a first implementation of a service interface adapter of the present invention, for implementing the method of the present invention.

In FIG. 1 there is disclosed a telecommunications environment comprising a package switched (PS) telecommunications network 1 and a circuit switched (CS) telecommunications network 2. The package switched telecommunications network may be for example an Internet Protocol (IP) Multimedia Subsystem (IMS) for providing telecommunications services to users thereof. Although the package switched telecommunications network 1 of FIG. 1 may be any suitable package switched telecommunications network for providing telecommunications services to users, let's assume that the invention is applied in an environment comprising an IMS network. In FIG. 1, the package switch telecommunications network therefore schematically illustrates an IMS environment.

Likewise, the circuit switched telecommunications network 2 may be any particular circuit switched telecommunications network, for providing circuit switched services to users. In particular, the telecommunications network 2 might be an Intelligent Network (IN), or Customize Applications for Mobile Networks Enhanced Logic (CAMEL) based network. Throughout the description below, the circuit switched network may be referred to either as a circuit switched or CS network, or a IN/CAMEL network, regardless of the fact that the invention may be applied to any type of circuit switched telecommunications network for providing telecommunications services to users.

Signalling within the circuit switched telecommunications network comprises standard circuit switched application parts transported over signalling system 7 (SS7) type signalling, and include for example mobile application parts (MAP), CAMEL application parts (CAP) such as various known CAP versions CAP v1, CAP v2, CAP v3, CAP v4, capability set 1 (CS1), capability set 1+ (CS1+), intelligent network application parts (INAP), transaction capabilities application parts (TCAP), integrated services digital network (ISDN) user parts (ISUP), and IS-41. Any suitable signalling protocol may be applied in a circuit switched network.

The package switched network is controlled using typical package switched protocols, such as, but not restricted to Session Initiation Protocol (SIP). The package switched IMS network 1, as illustrated in FIG. 1, comprises call session control functions (CSCF) such as CSCF 8, for processing SIP signalling packet in the network. In the illustration of FIG. 1, the relevant nodes and entities of the IMS network are illustrated, such as the CSCF 8, the home subscriber server (HSS) 9 and the Multimedia Telephony Application Server (MMTeI-AS) 10. Other entities, nodes and parts of the IMS network are schematically illustrated by cloud 5, which also comprises the access network to the IMS. Users 6 of the IMS network are connected through the access network (part of core network 5) to the IMS. Signalling for services used by the users 6 is controlled via call session control functions such as CSCF 8. CSCF 8, in the present example, is functionally connected to HSS 9 via a Cx interface 11 under DIAMETER. Multimedia Telephony Application Server (MMTeI-AS) 10 is a SIP application server (SIP-AS), functionally connected to the CSCF 8 via a IMS service control interface using SIP (ISC/SIP), indicated with reference numeral 16. Other SIP application servers may be functionally connected to the CSCF 8, but are not illustrated in FIG. 1. The MMTeI-AS) 10 and HSS 9 may communicate between each other via Sh interface 12, which is a DIAMETER type protocol.

Circuit switched telecommunications' network 2 comprises a core network 23 comprising a plurality of interconnected nodes for providing telecommunications services to users. In order to provide these services, telecommunications network 2 comprises a service control point (SCP) 20. In FIG. 1, only one SCP 20 is illustrated, however, the person skilled in the art will recognize that usually, in an IN/CAMEL network, a multiplicity of SCP's connected to several nodes in the network may be available for providing services. Similarly, FIG. 1 also schematically illustrates a home location register (HLR) 21, which contains user data of subscribers to the circuit switched telecommunications network 2.

In accordance with the invention, there is provided a legacy interface adaptor application server (LIA-AS) 15, functioning as a signaling gateway between the package switched network 1 and the circuit switched network 2. The LIA-AS 15 is a service interface adapter as referred to in the other part of this description and claims of the application. The LIA-AS functions as a gateway because it enables full translation between ISC/SIP type signaling used in the IMS network, a package switched type network, and the signaling used in the IN/CAMEL network, a circuit switched type network. More generally, the LIA-AS 15 provides full conversion and/or translation between package switched type signaling protocols and circuit switched type signaling protocols for providing services from either one type of network package switched (1) or circuit switched (2), in the other type of network, circuit switched (2) or package switched (1). The present example is directed to in particular a network node, the LIA-AS 15, which enables the provisioning of circuit switched type services directly from the circuit switched telecommunications network 2 to users 6 of the package switched type telecommunications network 1. Use is made of the infrastructure of the circuit switched network 2 for providing these services, however these services are provided to the user 6 through the package switched network 1.

In order to be able to facilitate the provision of circuit switched services directly from the circuit switched network, through the package switched IMS network 1 to the user 6, the LIA-AS 15 takes information from an incoming ISC/SIP type signaling protocol incoming from the IMS network 1, originating this information with further information (such as actively or passively acquired from the circuit switched network 2), and establishes a circuit switched type signaling protocol between the LIA-AS 15 and for example the service control point 20 of the circuit switched network 2. In addition, the further information is used, in combination with information incoming from both signaling data streams established (i.e. in the packaged switched and circuit switched networks 1 and 2), in order to exchange data between both the package switched type signaling protocol and the circuit switched type signaling protocol. The LIA-AS 15 therefore has an active role in the coordination between the signaling taken place in the circuit switched telecommunications network 2 and the signaling taken place in the package switched telecommunications network 1 on a signaling level, for providing the services to the user 6.

The further information used by the LIA-AS 15 may comprise mapping information, such as specified in 3GPP specification standard TS 29.163. This document specifies the principles of interworking between the IMS network and legacy CS networks, in order to support IP multimedia basic voice calls. In particular, this document addresses the area of control and user plane interworking between the IMS network and CS networks through the network functions, including the media gateway control function (MGCF) and IP multimedia media gateway (IM-MGW). Areas such as interworking between SIP and circuit switched type signalling protocols are detailed in terms of the processes and protocol mapping required for the support of IP multimedia originated and terminated voice calls. Using the mapping information specified in the above mentioned document, a translation between SIP based signalling protocols and circuit switched type signalling protocols may be made by the LIA-AS 15.

The further information, such as the mapping information described herein above, may be stored in a database that is used or contained in the service interface adapter LIA-AS 15. The database may alternatively be an external entity that is consulted by the LIA-AS 15 for converting between the circuit switched type signalling data stream and the package switched type signalling data stream.

Further information may also be retrieved from entities in the circuit switched telecommunications network. For example, existing functions in a mobile switching centre (MSC, not shown) or service switching function (SSF, not shown) within the circuit switched network 2 may be used to generate relevant parameters for interworking between the package switched signalling data stream established. These parameters may include for example the call reference number and/of the address of the gateway MSC (not shown) in the circuit switched network 2. Other entities in the circuit switched network 2, such as the HLR 21 or the SCP 20, or a visited location register (VLR, not shown) may also be triggered for referring the further information. The further information may also be retrieved from entities, such as the HSS 9, in the IMS network 1.

In addition, the further information may comprise supplementary service information of supplementary services available in circuit switched telecommunications network 2. Supplementary services may for example comprise call forwarding, advice of charge, call waiting, calling line identification (and related services), closed user groups or explicit call transfer. A configuration of the LIA-AS 15 that can be used for providing supplementary services from circuit switched network 2 to users 6 in package switched network 1, is described herein below in relation to FIG. 3.

LIA-AS 15 acts as an application server in the package switched IMS network 1. It is therefore controlled using ISC/SIP signalling protocols over interface 17, just as MMTel-AS 10 as described above. CSCF 8 may interact directly with LIA-AS 15 over interface 17, or in an alternative solution (as will be described in relation to FIG. 2), an indirect interface between CSCF 8 and LIA-AS 15 exists through MMTel-AS 10. Through the circuit switched network 2, the LIA-AS 15 may be connected as a functional entity, e.g. as an enhancement to an MSC, for controlling a media gateway (MGW). This is not illustrated in FIG. 1.

Figure 2:
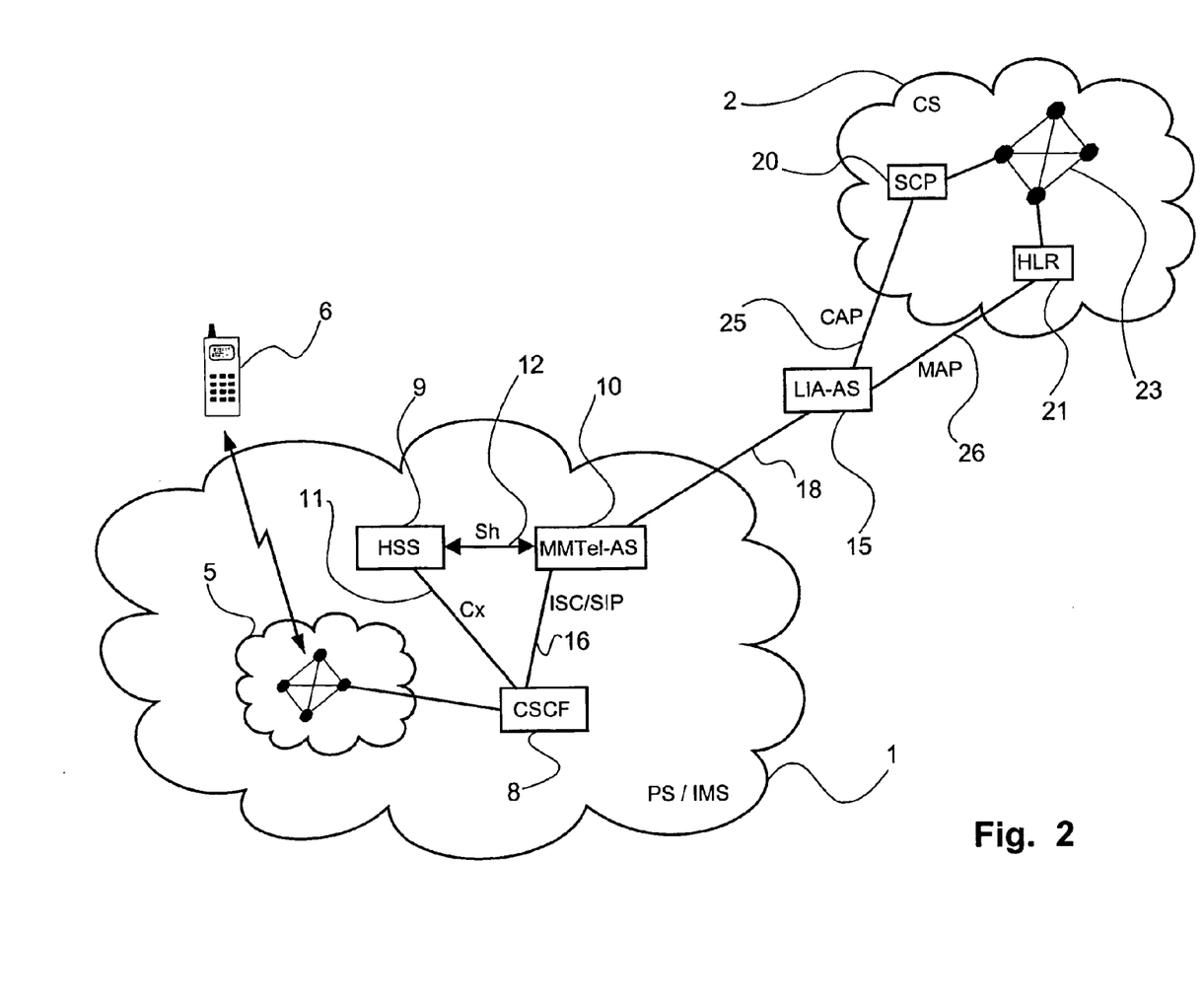
FIG. 2 discloses a second embodiment of an implementation of a service interface adapter according to the present invention.

FIG. 2 discloses an alternative of the implementation of the invention of FIG. 1. The implementation disclosed in FIG. 2 corresponds to the implementation of FIG. 1, and the components and entities illustrated in FIG. 2 have received simular reference numerals for as far as these component and entities are also present in FIG. 1. The only difference between the implementation of FIG. 1 and the implementation disclosed in FIG. 2, is the connection between the LIA-AS 15 and a package switched network 1. In FIG. 2, the LIA-AS 15 is connected via a Northbound interface 18 with MMTel-AS 10 of the IMS network 1. The advantage of this solution is that the MMTel-AS 10 keeps the final control over the communication session, and this allows a better interworking between the MMTel services that are invoked in the MMTel-AS 10, and the IN/CAMEL services invoked in the LIA-AS 15. Operation of the LIA-AS 15 is the same as in FIG. 1.

Figure 3:
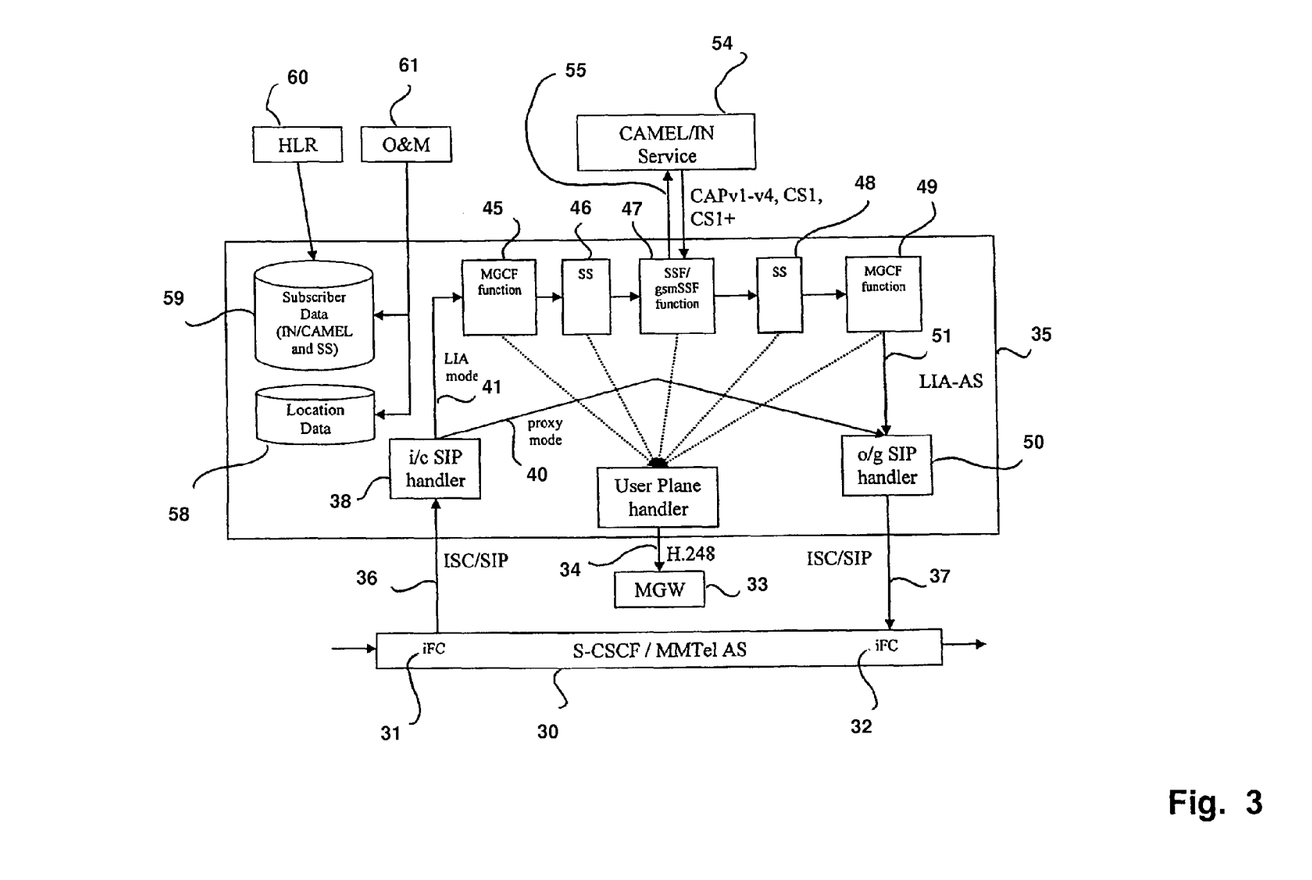
FIG. 3 schematically illustrates the internal operation and functioning of a service interface adapter according to the present invention.

FIG. 3 discloses schematically internal operation of an LIA-AS 35. In FIG. 3, there is disclosed an LIA-AS 35 connected to an IMS network schematically indicated with functional entity (S-CSCF/MMTel-AS) 30. LIA-AS 35 is also interconnected with a circuit switched network for providing IN/CAMEL services 54. Interfacing with the circuit switched network is schematically illustrated via interface 55, which may be a signalling interface based on signalling protocols such as CAP v1 through v4, CS1, CS1+ or other interfaces. Interfaces 36 and 37 with the IMS network are ISC/SIP interfaces, controlled by initial filter criteria (iFC) 31 and 32.

LIA-AS 35 comprises an incoming SIP handler 38 which determines whether incoming SIP messages are to be further processed by the LIA-AS 35, or whether these messages are to be forwarded in proxy mode 40 to the outgoing SIP handler 50. Alternatively, this function may also be performed in a CSCF of an IMS network in an alternative solution. In order to provide a circuit switched type signalling protocol for establishing the circuit switched services, the LIA-AS 35 uses a service switching function (SSF) or GSM service switching function (gsmSSF) functional entity 47. Retrieving information from the incoming SIP signalling data stream, and combining or augmenting this information with further information for feeding the SSF/gsmSSF function 47 for establishing the circuit switched type signalling protocol, is performed by the media gateway control function (MGCF) 45. The further information may be retrieved from databases such as comprised in the LIA-AS 35. The LIA-AS 35 comprises a subscriber database that comprises service related and user related information of subscribers to the IMS and/or CS network. It also contains information about supplementary services that may be provided through the LIA-AS 35. The storing of supplementary service information and provisioning thereof by the LIA-AS is optional, but is implemented in the LIA-AS 35 illustrated in FIG. 3. A further database 58 comprises location data or mapping information for location data that enables to translate the location information of the user 6 available in the IMS network to location information of the circuit switched type network. The database 59 may be updated using HLR 60 in the circuit switched network, or using an operation and maintenance function (O&M) 61. The location data base 58 may also be updated through the operation and maintenance function (O&M) 61.

Information coming back to the circuit switched type established signalling data stream over interface 55 may comprise information required by, or relevant for, the IMS network. This information, incoming on SSF/gsmSSF function 47, is retrieved by MGCF function 49 and communicated to the outaoing SIP handler 50 via interface 51. The outgoing SIP handler 50 is responsible for providing a return SIP signaling data stream over interface 37 back to functional entity 30 in the IMS network. The SIP data steam is returned to the CSCF 30, and the CSCF 30 will apply the iFC 32 to determine the further handling in the IMS network.

As already briefly mentioned above, the implementation of supplementary service provisioning via the LIA-AS 35 to users of the package switched IMS network, is a further option of an embodiment of the invention. In the implementation of FIG. 3, the LIA-AS 35 comprises supplementary functions 46 and 48 that enable executing a legacy GSM/WCDMA supplementary services using the internal subscriber database 59 that comprises supplementary service data.

Figure 4:
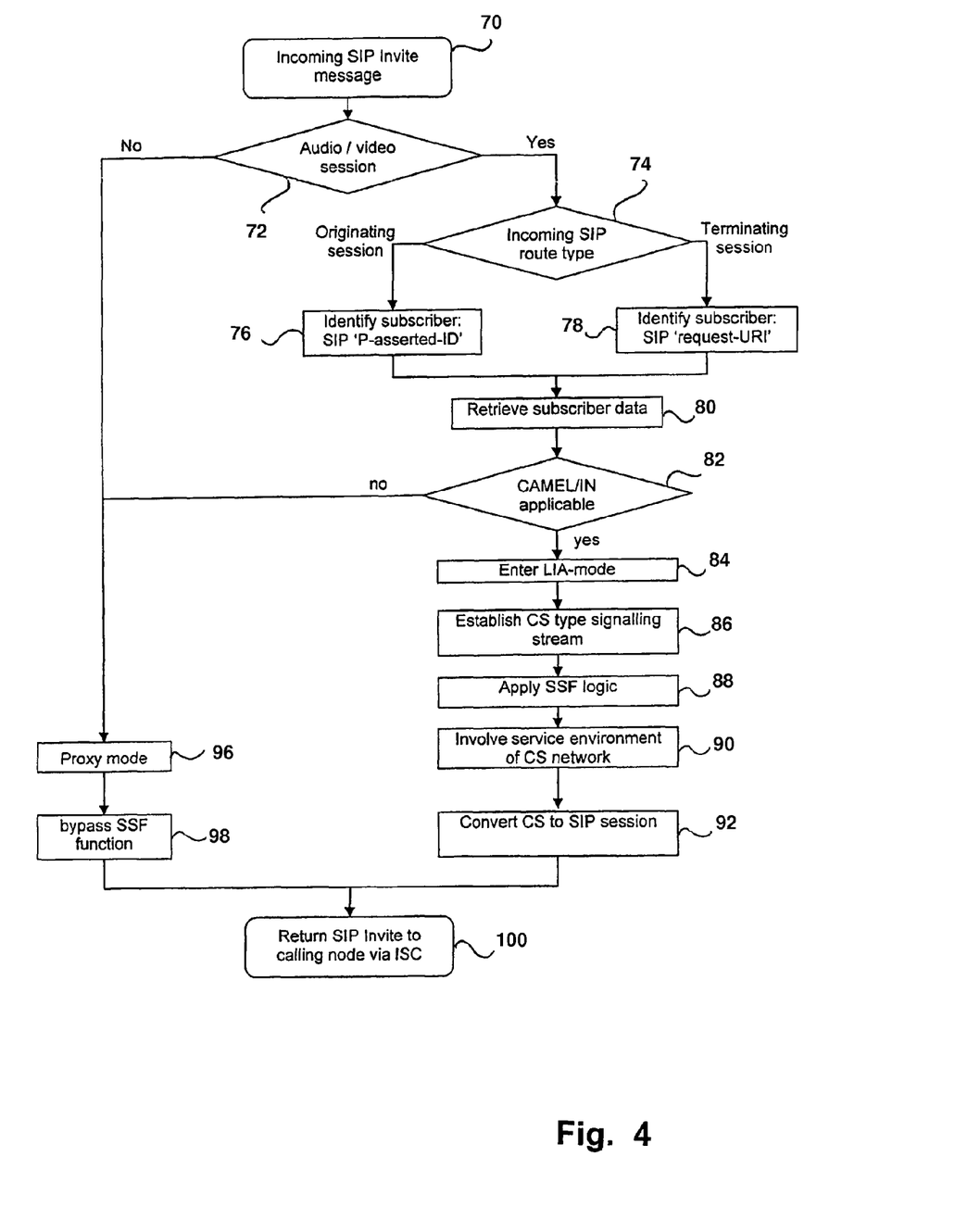
FIG. 4 schematically illustrates a method of the present invention.

FIG. 4 illustrates a method of the present invention, for operating the LIA-AS 35 of FIG. 3. When the LIA-AS 35 receives a SIP INVITE message (70) from the calling node (the S-CSCF or MMTel-AS) 30, the LIA-AS 35 verifies through the incoming SIP handler 38, whether the received session description protocol (SDP) information indicates the SIP INVITE message to be related to a audio or video communication session (step 72). If this is not the case, the LIA-AS 35 forwards the SIP INVITE message in proxy mode 96 to by-pass the SSF function (98), and return the SIP INVITE message to the IMS via outgoing SIP handler 50 and interface 37 (step 100). If the SIP INVITE message is related to an audio or video communication session, the SIP INVITE message is routed in the legacy interface adapter mode via interface 41 to the MGCF function 45. The media gateway (MGW) will then be seized.

In order to determine the circuit switched IN/CAMEL services applicable, an assessment is made of the session type of the communication session in step 74, i.e. whether it is an originating or terminating communication session. This verification can be made based on the incoming IP address/IP port of the SIP INVITE message. If the communication session is an originating session, the subscriber identity is determined by the LIA-AS 35 by the SIP header 'P-asserted-ID' in step 76. Alternatively, in step 78, the subscriber identity is identified for terminating sessions by analyses of the SIP header, in particular the 'request-URI' (URI: Universal Resource Indicator). Based on the subscriber identity determined in steps 76 and 78, the subscriber data can be retrieved from the data base 59 of the LIA-AS 35 in step 80. As an alternative to the use of the database 59 as indicated in FIG. 3, the subscriber data may be retrieved from the home location register (HLR) in the circuit switched network, or from the home subscriber server in the IMS network, e.g. on demand by the LIA-AS 35. It is also possible to retrieve this information from either the HLR or the HSS during the third party registration procedure for this user. As a further alternative, the mobile application part (MAP) anytime subscription interrogation procedure can be used for fetching the subscriber data for each call, from the HSS or the HLR. If subscription based circuit switched services are to be provided in the IMS network, it is also required to receive the International mobile subscriber identity (IMSI).

Once the subscriber data is available to the LIA-AS 35, in step 82 it is verified whether the subscriber has active, applicable IN/CAMEL services in the circuit switched network. If this is not the case, the LIA-AS 35 again turns to proxy mode and forwards the SIP signaling messages via the proxy interface 40 towards the outgoing SIP handler 50 and using the interface 37 to the IMS network. The SSF function 47 of the LIA-AS 35 is then by passed (step 98).

If services are applicable and available to the subscriber in the circuit switched telecommunications network, in step 84, the LIA mode is entered and a circuit switched type signalling stream is established in step 86 by the LIA-AS 35. The circuit switched type signaling stream is established using information retrieved by the MGCF function 45, and augmented by further information such as the subscriber data retrieved by the LIA-AS 35. SSF/gsmSSF function 47 is applied in step 88, and the circuit switched type signaling data stream is provided to the circuit switched telecommunications network for requesting and receiving the requested service therefrom. Signaling data and information pieces coming back within the signaling data stream provided over interface 55 to LIA-AS 35 may be exchanged with the SIP signaling session in step 92 in order to facilitate direct communication between the IMS network and the circuit switched telecommunications network for providing the services. Meanwhile in step 90, the circuit switched telecommunications network is involved for providing the services.

A SIP signaling data stream is returned from MGCF function 49 via the outgoing SIP handler 50 over interface 37, giving rise to generation of iFC's 32 in the IMS network.

Once service provisioning from the circuit switched network is concluded, and the service provisioning is ended, the LIA-AS 35 may switch back to proxy mode and leave further processing of the communication session to the IMS network. The communication session may in that case either be terminated in case it is concluded, or continued within the IMS network.

The invention is not limited to the embodiments disclosed above. Those skilled in the art will appreciate that some of the functionality performed by the components disclosed above may be implemented by hardware or software using suitably programmed processing equipment or a combination of hardware and software. The service interface adaptor or LIA-AS described above, may be a stand-alone network node functioning as a gateway node between the package switched telecommunications network and the circuit switched telecommunications network, or may be implemented as a functional extension of an existing node such as an MSC in the circuit switched network or another network node in de IMS network (e.g. the MMTel-AS). The invention is only limited by the scope of the appended claims.

The invention claimed is:

1. A method of providing a value added circuit switched service to a packet switched user device, the method implemented by a service interface adapter comprising the steps of:
   receiving a Session Initiation Protocol (SIP) Invite message;
   verifying whether the SIP Invite message is related to an audio or video session;
   if the SIP Invite message is not related to an audio or video session, then returning the SIP Invite message to an Internet Protocol Multimedia Subsystem (IMS) network;
   if the SIP Invite message is related to an audio or video session, then determining whether the SIP Invite message is associated with an originating communication session or a terminating communication session;
   if the SIP Invite message is associated with the originating session, then identifying said packet switched user device based on a P-Asserted-identity parameter in said SIP invite message;
   if the SIP Invite message is associated with the terminating session, then identifying said packet switched user device based on a Request-Uniform Resource Identifier (Request-URI) parameter in said SIP invite message;
   after the identifying step, retrieving subscriber data associated with said packet switched user device;
   verifying, based on the retrieved subscriber data, if said packet switched user device has active Intelligent Network/Customized Applications for Mobile Networks Enhance Logic (IN/CAMEL) services in a circuit switched telecommunication network;
   if said packet switched user device does not have active IN/CAMEL services, then returning the SIP Invite message to the IMS network;
   if said packet switched user device does have active IN/CAMEL services, then perform following steps:
   establishing, based on information from said SIP Invite message and augmented with further information, a circuit switched type signaling stream of a basic call state model of a circuit switched dedicated protocol type between said service interface adapter and said circuit switched telecommunications network;
   providing the circuit switched type signaling stream to said circuit switched telecommunications network for requesting and receiving the requested value added circuit switched service therefrom; and
   exchanging data between said circuit switched type signaling stream with said circuit switched telecommunications network and a communications session that the packet switched user device currently has ongoing with the IMS network to provide said value added circuit switched service which is an IN/CAMEL service from said circuit switched telecommunications network to said packet switched user device through said IMS network.

2. The method according to claim 1, wherein said further information comprises mapping information, said mapping information used for mapping of at least a part of said information from said first signaling data stream for establishing said second signaling data stream.

3. The method according to claim 1, wherein said further information is retrieved from a database.

4. The method according to claim 1, wherein said further information is provided by said service interface adapter.

5. The method according to claim 1, wherein said further information is retrieved from said circuit switched telecommunications network.

6. The method according to claim 5, wherein said further information is retrieved from a node selected from a group comprising a mobile switching center (MSC), a Service Switching Function (SSF), a Global System for Mobile communications Service Switching Function (gsmSSF), a Service Control Entity (SCP), location register, such as a Home Location Register (HLR) and a Visited Location Register (VLR).

7. The method according to claim 1, wherein said further information is retrieved from said packet switched telecommunications network.

8. The method according to claim 1, wherein said further information comprises supplementary service information of supplementary services available in said circuit switched telecommunications network.

9. A service interface adapter being arranged for providing a value added circuit switched service to a packet switched user device, said service interface adapter comprising:
- a processing equipment programmed to perform operations as follows:
- receive a Session Initiation Protocol (SIP) Invite message;
- verify whether the SIP Invite message is related to an audio or video session;
- if the SIP Invite message is not related to an audio or video session, then return the SIP Invite message to an Internet Protocol Multimedia Subsystem (IMS) network;
- if the SIP Invite message is related to an audio or video session, then determine whether the SIP Invite message is associated with an originating communication session or a terminating communication session;
- if the SIP Invite message is associated with the originating session, then identify said packet switched user device based on a P-Asserted-identity parameter in said SIP invite message;
- if the SIP Invite message is associated with the terminating session, then identify said packet switched user device based on a Request-Uniform Resource Identifier (Request-URI) parameter in said SIP invite message;
- after the identify operation, retrieve subscriber data associated with said packet switched user device;
- verify, based on the retrieved subscriber data, if said packet switched user device has active Intelligent Network/Customized Applications for Mobile Networks Enhance Logic (IN/CAMEL) services in a circuit switched telecommunication network;
- if said packet switched user device does not have active IN/CAMEL services, then return the SIP Invite message to the IMS network;
- if said packet switched user device does have active IN/CAMEL services, then perform following operations:
- establish, based on information from said SIP Invite message and augmented with further information, a circuit switched type signaling stream of a basic call state model of a circuit switched dedicated protocol type between said service interface adapter and said circuit switched telecommunications network;
- provide the circuit switched type signaling stream to said circuit switched telecommunications network for requesting and receiving the requested value added circuit switched service therefrom; and
- exchange data between said circuit switched type signaling stream with said circuit switched telecommunications network and a communications session that the packet switched user device currently has ongoing with the IMS network to provide said value added circuit switched service which is an IN/CAMEL service from said circuit switched telecommunications network to said packet switched user device through said IMS network.

10. The service interface adapter according to claim 9, wherein said further information comprises mapping information, said mapping information used for mapping of at least a part of said information from said first signaling data stream for establishing said second signaling data stream.

11. The service interface adapter according to claim 9, wherein said further information is retrieved from a database.

12. The service interface adapter according to claim 9, wherein said further information is provided by said service interface adapter.

13. The service interface adapter according to claim 9, wherein said further information is retrieved from said circuit switched telecommunications network.

14. The service interface adapter according to claim 13, wherein said further information is retrieved from a node selected from a group comprising a mobile switching center (MSC), a Service Switching Function (SSF), a Global System for Mobile communications Service Switching Function (gsmSSF), a Service Control Entity (SCP), location register, such as a Home Location Register (HLR) and a Visited Location Register (VLR).

15. The service interface adapter according to claim 9, wherein said further information is retrieved from said packet switched telecommunications network.

16. The service interface adapter according to claim 9, wherein said further information comprises supplementary service information of supplementary services available in said circuit switched telecommunications network.

* * * * *